April 19, 1960 — E. W. HUBER — 2,932,897
MEASURING DEVICE
Filed June 26, 1958

INVENTOR.
ERWIN W. HUBER
BY
ATTORNEY

United States Patent Office 2,932,897
Patented Apr. 19, 1960

2,932,897

MEASURING DEVICE

Erwin W. Huber, Towson, Md., assignor to Topflight Corporation, a corporation of Pennsylvania Application June 26, 1958, Serial No. 744,769

3 Claims. (Cl. 33—137)

This invention relates to improvements in a measuring device, and more particularly to a compact measuring device suitable for mailing or handling, yet arranged to be expanded into a substantially longer measuring device than the compact form thereof.

Elongated measuring instruments such as yard sticks, and the like, are used extensively for various measuring purposes. However, because of the length thereof, they are not readily adapted for convenient storage or mailing. Rendering an elongated measuring instrument more compact has been solved heretofore in a number of different ways such as by making a rigid elongated rule foldable in various ways, these being the type frequently used by carpenters and other mechanics. More recently, metallic strip rules have been provided in coil form and are widely used, the same being very compact when fully retracted into coil form. These types of contractible measuring instruments however do not lend themselves to inexpensive production, nor are they readily affixable to the edge of a work table, work bench, sewing machine, or the like.

Various types of paper and synthetic resin material arranged in strip form are used extensively at the present with pressure sensitive adhesive permanently applied to one surface thereof and said strips being coiled to facilitate the handling thereof. Such material is widely used for having advertising and information of various types printed or otherwise affixed to the surface thereof opposite that to which the adhesive is applied. Coiled strip material of this type would be suited for printing or otherwise affixing measuring indicia in an extensive series upon one surface of the material, whereby a measuring instrument could be formed which would be attachable to a suitable work surface to support the same, whereby a coiled tape of this type would be less expensive than the contractible measuring instruments referred to above. However, a coiled strip tape of this type is relatively bulky for mailing purposes, whereby it is not readily suited to convenient mailing, especially when such tapes are intended for distribution by mailing. Further, the printing of such strips or tapes for purposes of furnishing a measuring means of substantial length such as three feet or more, and then coiling the individual tapes for separable adherence of the convolutions of the coil to each other is found to be relatively expensive, though less expensive than the contractible wooden and steel rules referred to above.

It is the principal object of the present invention to provide a measuring instrument or device capable of having substantial length such as of the order of three feet or more, yet the same is arranged in flat, preferably rectangular form within suitable dimensions to render the same capable of being mailed in a business envelope of conventional size.

Ancillary to this object, it is a further object of the invention to provide a series of strips of suitable material, preferably arranged in side-by-side relationship upon a backing sheet and to which sheet said strips peelably adhere by means of pressure sensitive adhesive material, each of said strips having a series of indicia thereon respectively comprising a related increment to a series of measuring indicia of greater length than that on each individual strip.

A further object of the invention is preferably to have the adhesive material permanently adhering to the strips of material for peelable adherence to a base strip, whereby when the strips are removed from said base strip, they may be mounted in end-to-end relationship upon a supporting surface and the adhesive material upon the strips may be utilized to affix the same to said supporting surface.

Still another object of the invention is to arrange the indicia upon the individual strips in such manner that the desired relationship of the series of indicia upon the individual strips readily indicates the intended relationship of the strips when mounted in end-to-end relationship upon a supporting surface and, further, a series of indicia common to two adjacent strips may be divided by the slitting operation to form the strips and thereby minimize the amount of printing of the indicia upon the strips.

Details of the foregoing objects and of the invention are set forth in the following specification and illustrated in the accompanying drawing comprising a part thereof.

Figure 1:
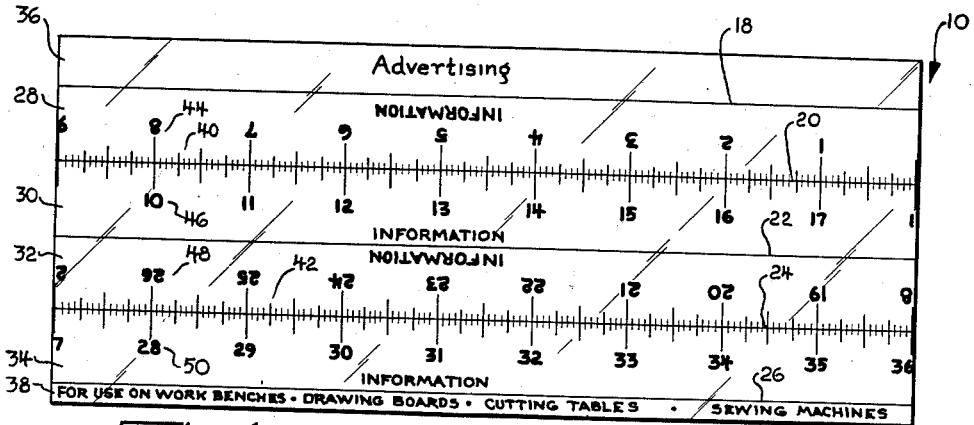
Fig. 1 is a top plan view of a measuring device illustrating an exemplary arrangement of measuring strips having indicia thereon and arranged in accordance with the principles of the invention.
Figure 2:
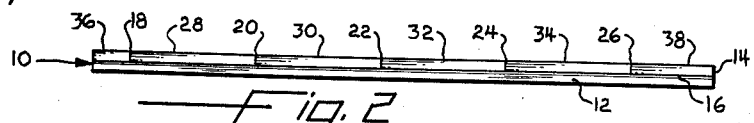
Fig. 2 is an enlarged end elevation of the device shown in Fig. 1 and illustrating an exemplary slitting operation, the illustration of the strips and base sheet of the device shown in this view being exaggerated to facilitate the understanding of the invention.

An exemplary measuring device 10 embodying the principles of the present invention is shown in Fig. 1. Referring to Fig. 2, wherein the device of Fig. 1 is shown in enlarged and exaggerated end elevation, it will be seen that said device comprises a base sheet 12 which, in the specific illustration shown herein is rectangular. However, it is to be understood that said specific shape is not restrictive to the present invention.

Superimposed upon the base sheet 12 is a second sheet 14 and a layer of preferably pressure-sensitive adhesive 16 of any suitable type, is disposed between base sheet 12 and second sheet 14 for purposes of separably adhering said sheets together. In the preferred embodiment of the invention, the layer of adhesive 16 is permanently adhered to the undersurface of second sheet 14, and said adhesive is peelably removable from base sheet 12. If desired or necessary, such peelable separation of the adhesive 16 from the adjacent surface of base sheet 12 may be facilitated by applying a resist coating to said surface of sheet 12, said coating being of any commonly used material such as varnish or the like.

Base sheet 12 and second sheet 14 may be formed from any suitable sheet material, either of paper stock or synthetic resin, or a combination of one or both of these with any other suitable material. Preferably however, the upper surface of second sheet 14 is finished suitably so as to render the same durable in use for a substantial period of time, such as by applying a coating of lacquer or other appropriate material thereto.

After second sheet 14 has been adhered to base sheet 12, the composite sheet assembly may be passed through a suitable slitting machine, whereby a series of slits 18, 20, 22, 24, and 26 are formed preferably only in the second sheet 14 but said slits preferably extend entirely through the second sheet 14 and possibly even partially into the layer 16 of adhesive. However, the base sheet 12 remains substantially intact so as to retain the superimposed sheets in assembled relationship until ready for use. The purpose of the slits referred to is to form a series of strips 28, 30, 32 and 34, said strips preferably being of uniform width, as well as of uniform length. It also will be seen that border strips 36 and 38 are formed adjacent opposite edges of the measuring device 10, preferably for purposes of affording additional surfaces upon which advertising or other appropriate information may be printed or affixed. It is not necessary to provide such border strips however and, where the same are not desired, the second sheet 14 preferably is slit to provide a series of strips of uniform width, the outermost strips being co-extensive at the outer edges thereof with the outer edges of base sheet 12.

To simplify the description and illustration of the present invention, it will be assumed that the measuring device 10 is intended to form a tape three feet in length, commonly referred to as a yard stick. Hence, it will be assumed that the composite sheet used will be nine inches long and approximately four and three-quarter inches wide. This size of sheet readily may be placed in a number 10 envelope and mailed for advertising or other purposes of distribution. It also will be understood that a much larger sheet of composite material will be formed initially and, after printing the desired subject matter and indicia thereon, to be described in detail hereinafter, the large sheet may be severed into units of the exemplary size referred to above.

Before the second sheet 14 is affixed to the base sheet 12, or after the same is affixed to said base sheet, said second sheet is printed to provide a plurality of double scales 40 and 42, that is, the scales will have indicia lines extending preferably equally in opposite directions from the slit lines 20 and 24, whereby when said composite scales are slit, each of the strips formed by such slitting will have a row of measuring indicia at one edge thereof and extending to said edge.

As is illustrated readily in Fig. 1, the double scales 40 and 42 also have pairs of rows of measure-indicating numerals 44, 46, 48 and 50. As is shown in Fig. 1, the row of numerals 44 is upside down to the row of numerals 46 and the row 48 is upside down to the row 50. Such arrangement simplifies the printing, yet results in each of the strips 28, 30, 32 and 34 having a series of measuring indicia thereon, each of which comprises a related increment or sub-multiple, such as nine inches, of the total scale to be formed by said strips when placed in end-to-end relationship upon a supporting surface such as a work table 52. The rows of measure-indicating numerals will themselves indicate the arrangement in which the various strips are to be disposed upon the supporting surface 52. Further, in slitting the second sheet 42, the slitting machine is adjusted preferably so as to evenly bisect the double scales 40 and 42 of measuring lines, whereby the strips when assembled in end-to-end relationship will provide a scale having substantially even measuring lines or indicia along the entire length of one edge thereof.

The accuracy of the assembled strips is insured by precisely cutting the opposite ends of the compositely assembled base sheet 12 and second sheet 14, said ends being exactly square with the slits 20 and 24 particularly. Also, inasmuch as the adhesive layer 16 preferably is permanently attached to the undersurface of the strips 28, 30, 32 and 34, said adhesive will serve to secure said strips to the supporting surface 52, whereby when care is used in abutting said strips against each other in end-to-end relationship, an accurate elongated measuring strip will be provided upon said supporting surface.

Figure 3:
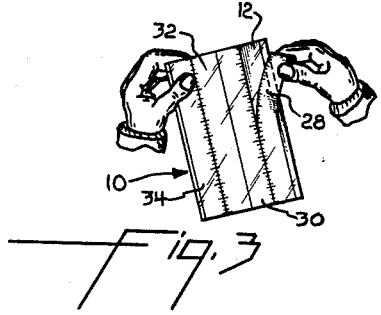
Fig. 3 is an exemplary perspective view illustrating a method of removing the strips from the base sheet incident to mounting the same upon a supporting surface.
Figure 4:
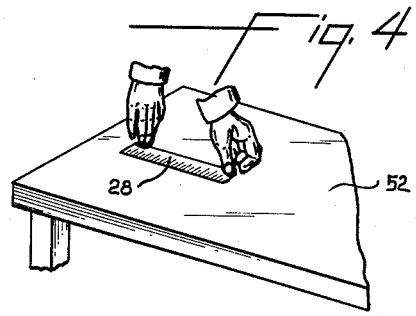
Fig. 4 is a fragmentary perspective view illustrating the operation of mounting one of said strips upon a suitable supporting surface such as a work table.
Figure 5:
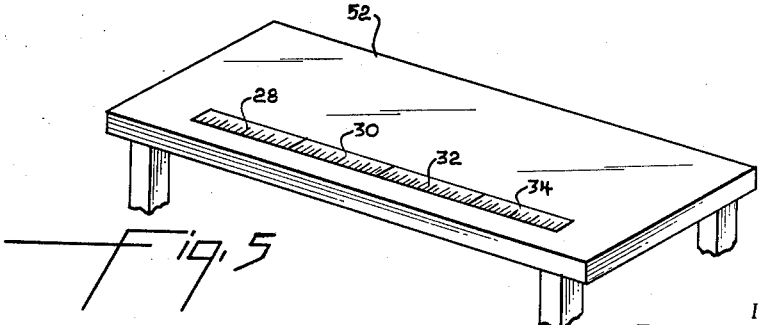
Fig. 5 is a perspective view of an exemplary supporting surface such as a work table to which the various strips of the measuring device shown in Fig. 1 have been affixed in end-to-end relationship to comprise the extended form of the measuring device of which each strip comprises a related part.

When applying the strips of measuring device 10 to the supporting surface 52 for example, the strip 28 first is peelably separated from base sheet 12 as illustrated in exemplary manner in Fig. 3. Said strip then is applied to supporting surface 52 carefully, as indicated in Fig. 4, inasmuch as said first applied strip will establish the position of all of the other strips relative to one edge of the supporting surface 52 on a work table for example. The strips 30, 32 and 34 then are successively removed from base sheet 12 and are placed in end-to-end relationship with the first applied strip 28 and the sucessively applied strips, whereby the final assembly upon the supporting surface 52 will resemble the exemplary illustration shown in Fig. 5.

By providing a measuring scale along one edge only of each strip, adequate space is provided along the opposite edges of each strip upon which desired information, advertising material, or otherwise may be printed of affixed by any convenient means. Such areas are indicated in Fig. 1 by the legend "Information."

After the increment strips have been assembled in end-to-end relationship to comprise the full scale of measuring indicia of which each strip comprises a related part, the base sheet 12, being inexpensive, readily may be expended since this cost is trifling. Also, notwithstanding the fact that the second sheet 14 preferably is formed of inexpensive material, it nevertheless comprises a highly serviceable and durable measuring scale upon a suitable work surface, primarily because of its preferably extreme thinness and its very close adherence to the supporting surface due to the adhesive on the underside of each strip. As indicated above, the upper surface of said strips likewise preferably is provided with a durable finish coating of lacquer or the like, thereby further enhancing the life of the measuring scale.

Although the conventional English measuring system of inches is illustrated specifically in the drawing, it is to be understood that the indicating scales formed upon the strips comprising sheet 14 may comprise any other suitable scale of length or otherwise and employ other measuring systems such as metric or otherwise. Similarly, the scales may be used to determine desirable information other than distance such as temperature, cubic content, and the like.

Still another use for scales of the type embodied in the present invention is that for determining the growth of children, whereby an appropriate scale such as one commencing at about thirty inches, can be affixed to a wall, door jamb, or the like, when the lower end of the scale is affixed a distance from the floor corresponding to the lowest measuring numeral upon the scale, the scale extending vertically upwardly from the lower end thereof. In addition to the extensive versatility of use of the scales referred to above in regard to the measuring device described herein, one of the principal advantages thereof is that a very inexpensive measuring device is provided which comprises a series of strips having related increments of a total scale thereon, which total scale is substantially longer than each individual strip upon which said scale increment is placed. Each strip increment however is mounted upon a supporting or base sheet in compact arrangement, whereby the assembled strips upon the base sheet, prior to being affixed to a supporting surface, readily may be handled and stored, as well as distributed by mailing or otherwise in conventional means such as envelopes or the like. No appreciable bulk is present to comprise a problem such as is involved in distributing coil strips or the like, or unusually long measuring means such as a conventional wooden yard stick.

While the base sheet 12 primarliy is used as a means of facilitating the storage and handling of the measuring strips comprising second sheet 14, the outer surface of base sheet 12 provides ready means for printing instructions for use of the measuring device or, if desired, measuring device 10 may be used as a mailing piece, without placing the same in an envelop, and simply by affixing the name and address of an addressee upon the outer surface of base sheet 12.

While the invention has been described and illustrated in its preferred embodiment, and has included certain details, it should be understood that the invention is not to be limited to the precise details herein illustrated and described since the same may be carried out in other ways falling within the scope of the invention as claimed.

I claim:

1. Measuring means comprising in combination, a base sheet, a second sheet of similar size superimposed against one surface of said base sheet, pressure sensitive adhesive means between said sheets and peelably securing said sheets together, said second sheet being slit to form a series of similar strips, and a series of scale indicia formed upon the outer surface of each of said strips and extending from end to end thereon, each of said series of indicia upon said strips being a sub-multiple of a greater scale series formed by said strips when removed from said base sheet and arranged in end-to-end relationship upon a supporting surface, and said base sheet being equal in length to one of said strips bearing a sub-multiple of a greater scale series of indicia.

2. Measuring means comprising in combination, a substantially flat base sheet, a second sheet of similar size superimposed against one surface of said base sheet, pressure sensitive adhesive means between said sheets and permanently adhering to said second sheet but peelably adhering to said base sheet to secure said sheets together, said second sheet being slit to form a series of similar strips in edgewise abutting relationship, and a series of scale indicia formed upon the outer surface of each of said strips and extending from end to end thereon, each of said series of indicia upon said strips being a sub-multiple of a greater series formed by said strips when removed from said base sheet and arranged in end-to-end relationship upon a supporting surface, said adhesive means upon said strips being operable to secure said strips in the arrangement aforesaid to said supporting surface and said base sheet being equal in length to one of said strips bearing a sub-multiple of a greater scale series of indicia.

3. Measuring means comprising in combination, a substantially flat base sheet, a second sheet of similar size superimposed against one surface of said base sheet, pressure sensitive adhesive means between said sheets and peelably securing said sheets together, said second sheet being slit to form a series of an even number of similar strips, and a series of rows of measuring scale indicia formed upon the outer surface of each of said strips and extending from end to end thereon, each of said series of indicia upon said strips being a sub-multiple of a greater scale series of measuring indicia formed by the rows of indicia upon said strips when said strips are removed from said base sheet and arranged in end-to-end relationship upon a supporting surface, said rows of measuring indicia upon adjacent strips being arranged adjacent the slit separating said strips and one of said rows of indicia being arranged in upside down relationship to the adjacent row of indicia of each pair thereof and said base sheet being equal in length to one of said strips bearing a sub-multiple of a greater scale series of indicia.

References Cited in the file of this patent

UNITED STATES PATENTS

| 2,514,455 | Putnam | July 11, 1950 |
| 2,616,559 | Hyland | Nov. 4, 1952 |
| 2,742,705 | Gelardi | Apr. 24, 1956 |